(12) United States Patent
    Katayama et al.

(10) Patent No.: US 10,263,271 B2
(45) Date of Patent: Apr. 16, 2019

(54) REDOX TYPE FUEL CELL

(71) Applicant: TOYOTA JIDOSHA KABUSHIKI KAISHA, Toyota-shi, Aichi-ken (JP)

(72) Inventors: Yukihisa Katayama, Nagoya (JP); Haruyuki Nakanishi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 339 days.

(21) Appl. No.: 15/320,134

(22) PCT Filed: Jun. 15, 2015

(86) PCT No.: PCT/JP2015/067137
 § 371 (c)(1),
 (2) Date: Dec. 19, 2016

(87) PCT Pub. No.: WO2015/198900
 PCT Pub. Date: Dec. 30, 2015

(65) Prior Publication Data
 US 2017/0141425 A1    May 18, 2017

(30) Foreign Application Priority Data
 Jun. 24, 2014  (JP) ................................ 2014-129049

(51) Int. Cl.
    *H01M 8/18*     (2006.01)
    *H01M 8/04186*  (2016.01)
(52) U.S. Cl.
    CPC ....... *H01M 8/188* (2013.01); *H01M 8/04186* (2013.01); *Y02E 60/528* (2013.01)

(58) Field of Classification Search
    None
    See application file for complete search history.

(56) References Cited

U.S. PATENT DOCUMENTS

| 2010/0297522 A1 | 11/2010 | Creeth et al. |
| 2011/0039170 A1 | 2/2011 | Creeth et al. |

(Continued)

FOREIGN PATENT DOCUMENTS

| JP | 2009-530784 A | 8/2009 |
| JP | 2011-510466 A | 3/2011 |
| WO | 2007/110663 A2 | 10/2007 |

(Continued)

*Primary Examiner* — Wyatt P McConnell
(74) *Attorney, Agent, or Firm* — Hunton Andrews Kurth LLP

(57) ABSTRACT

The present invention is to provide a redox type fuel cell that is able to quickly regenerate a mediator. The present invention is such a redox type fuel cell that a mediator is circulated in a cathode electrode, wherein a regenerator for oxidizing the mediator includes: a first chamber configured to store a mediator-containing solution; a second chamber configured to store an oxygen reduction reaction medium solution; a power source; a first electrode disposed in the first chamber and connected to a positive electrode of the power source: a second electrode disposed in the second chamber and connected to a negative electrode of the power source; an ion exchange path configured to connect the first chamber and the second chamber; and a gas supplier configured to supply an oxygen-containing gas into the second chamber.

2 Claims, 3 Drawing Sheets

(56) References Cited

U.S. PATENT DOCUMENTS

2011/0189520 A1* 8/2011 Carter ................ B60L 11/1879
                                                            429/107
2013/0071702 A1    3/2013 Longman et al.

FOREIGN PATENT DOCUMENTS

WO    2009/093082 A1    7/2009
WO    2012/085542 A1    6/2012

* cited by examiner

REDOX TYPE FUEL CELL

CROSS-REFERENCE TO RELATED APPLICATIONS

This is a national phase application based on the PCT International Patent Application No. PCT/JP2015/067137 filed Jun. 15, 2015, claiming priority to Japanese Patent Application No. 2014-129049 filed Jun. 24, 2014, the entire contents of both of which are incorporated herein by reference.

TECHNICAL FIELD

The present invention relates to a redox type fuel cell.

BACKGROUND ART

A redox type fuel cell is a fuel cell in which at least one of a fuel and an oxidant is reacted with a redox couple (mediator), instead of being directly reacted in electrodes, and the redox couple is reacted in at least one of an anode electrode and a cathode electrode. The redox type fuel cell is characterized in that it has long lifetime or it does not need to use an expensive catalyst (e.g., platinum) in electrodes.

In a fuel cell in which a hydrogen gas is used as a fuel and an oxygen gas is used as an oxidant, generally, an oxygen reduction reaction is slow and constitutes a large part of fuel cell polarization. Accordingly, there is a well-known redox type fuel cell in which a hydrogen gas is supplied to an anode electrode and a redox couple-containing solution is supplied to a cathode electrode only.

A redox type fuel cell is described in Patent Literature 1, in which a mediator-containing nonvolatile catholyte solution is circulated between a cathode and a regenerator, and the mediator reduced in the cathode during discharge is reacted in the regenerator by oxygen injection, thereby oxidizing and regenerating the mediator.

CITATION LIST

Patent Literature 1: Japanese translation of PCT international application No. 2011-510466

SUMMARY OF INVENTION

Technical Problem

The method disclosed in Patent Literature 1, which is a method for oxidizing the mediator only by air injection into the mediator-containing catholyte solution, has poor contact efficiency between the mediator and oxygen and provides low mediator regeneration efficiency.

Also, the catholyte solution is diluted by water produced in the regeneration process of the mediator, and the injected air remains in the catholyte solution. Therefore, reaction efficiency in the cathode electrode of the fuel cell is decreased.

The present invention was achieved in light of the above circumstance. An object of the present invention is to provide a redox type fuel cell that is able to efficiently regenerate the mediator and to avoid a water production problem in the mediator-containing solution in association with an oxygen reduction reaction and a residual gas problem in association with the injection of an oxygen-containing gas into the mediator-containing solution.

Solution to Problem

The redox type fuel cell of the present invention is a redox type fuel cell wherein a mediator circulation path is disposed between a cathode electrode and a regenerator, and a mediator reduced at the cathode electrode is oxidized with the regenerator and supplied to the cathode electrode again; wherein the regenerator comprises: a first chamber configured to store a mediator-containing solution; a first piping configured to allow the mediator-containing solution to flow from the cathode electrode to the first chamber; a second piping configured to allow the mediator-containing solution to flow from the first chamber to the cathode electrode; a second chamber configured to store an oxygen reduction reaction medium solution; a power source; a first electrode disposed in the first chamber and connected to a positive electrode of the power source; a second electrode disposed in the second chamber and connected to a negative electrode of the power source; an ion exchange path configured to connect the first chamber and the second chamber; and a gas supplier configured to supply an oxygen-containing gas into the oxygen reduction reaction medium solution in the second chamber; and wherein, by turning on electricity using the power source, the reduced mediator contained in the mediator-containing solution can be oxidized in the first chamber, and the oxygen supplied from the gas supplier can be reduced in the second chamber.

In the present invention, the oxygen reduction reaction medium solution in the second chamber may be acidic.

Advantageous Effects of Invention

According to the present invention, the mediator can be quickly oxidized and regenerated. Also, the water production problem in the mediator-containing solution in association with an oxygen reduction reaction and the residual gas problem in association with the injection of the oxygen-containing gas into the mediator-containing solution, can be avoided.

DESCRIPTION OF EMBODIMENTS

Figure 1:
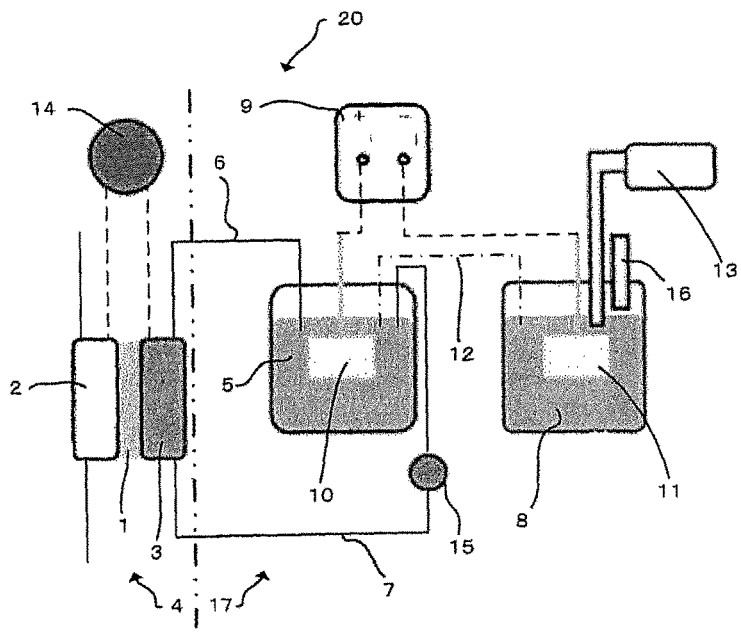
FIG. 1 is a view of the basic structure of the redox type fuel cell according to the present invention.

The redox type fuel cell of the present invention is a redox type fuel cell wherein a mediator circulation path is disposed between a cathode electrode and a regenerator, and a mediator reduced at the cathode electrode is oxidized with the regenerator and supplied to the cathode electrode again; wherein the regenerator comprises: a first chamber configured to store a mediator-containing solution; a first piping configured to allow the mediator-containing solution to flow from the cathode electrode to the first chamber; a second piping configured to allow the mediator-containing solution to flow from the first chamber to the cathode electrode; a second chamber configured to store an oxygen reduction reaction medium solution; a power source; a first electrode disposed in the first chamber and connected to a positive electrode of the power source; a second electrode disposed in the second chamber and connected to a negative electrode of the power source; an ion exchange path configured to connect the first chamber and the second chamber; and a gas supplier configured to supply an oxygen-containing gas into the oxygen reduction reaction medium solution in the second chamber; and wherein, by turning on electricity using the power source, the reduced mediator contained in the mediator-containing solution can be oxidized in the first chamber, and the oxygen supplied from the gas supplier can be reduced in the second chamber.

In the present invention, the process of regenerating an oxidized mediator from a reduced mediator does not oxidize the mediator by direct contact with an oxidant (oxygen), and it indirectly oxidizes the mediator with oxygen.

The first half reaction is as follows: in the first chamber, the mediator-containing solution is brought into contact with the electrode connected to the positive electrode of the power source to turn on electricity, thereby removing electrons through the electrode from the mediator and oxidizing the mediator.

The second half reaction is as follows: in the second chamber, the oxygen reduction reaction medium solution is brought into contact with the electrode connected the negative electrode of the power source to turn on electricity, with supplying the oxygen-containing gas, thereby donating the electrons removed from the mediator to oxygen (the oxidant) and reducing oxygen.

By the first half reaction, the oxidized mediator is regenerated, and by the second half reaction, the electrons from the mediator are consumed by oxygen (the oxidant). Therefore, the reaction balances out and, as a result, a regeneration reaction that the reduced mediator is oxidized by oxygen, is completed.

The redox type fuel cell of the present invention electrochemically promotes the mediator oxidation reaction, using the power source; therefore, the mediator can be quickly regenerated at ordinary temperature (ambient temperature). Therefore, the mediator regeneration efficiency is increased.

Also, the redox type fuel cell of the present invention uses the power source; therefore, a reaction site where the mediator is oxidized (that is, a space in the first chamber) and a reaction site where the electrons produced by the oxidation of the mediator is treated (that is, a space in the second chamber) can be physically separated from each other. As a result, the water production problem in the mediator-containing solution in association with an oxygen reduction reaction and the residual gas problem in association with the injection of the oxygen-containing gas into the mediator-containing solution, can be avoided.

The basic structure of the redox type fuel cell of the present invention will be explained by reference to figures.

As shown in FIG. 1, a redox type fuel cell 20 (the redox type fuel cell of the present invention) is composed of a cell assembly 4 and a regenerator 17. The cell assembly 4 is composed of a plurality of fuel cells, each of which is composed of an anode electrode 2 and a cathode electrode 3. The anode electrode 2 and the cathode electrode 3 are separated from each other by an electrolyte membrane 1. The regenerator 17 is composed of a first chamber 5 configured to store the mediator-containing solution; a first piping 6 configured to allow the mediator-containing solution to flow from the cathode electrode to the first chamber; a second piping 7 configured to allow the mediator-containing solution to flow from the first chamber to the cathode electrode; a second chamber 8 configured to store the oxygen reduction reaction medium solution; a power source 9; a first electrode 10 disposed in the first chamber and connected to the positive electrode of the power source; a second electrode 11 disposed in the second chamber and connected to the negative electrode of the power source; an ion exchange path 12 configured to connect the first chamber and the second chamber; and a gas supplier 13 configured to supply the oxygen-containing gas into the oxygen reduction reaction medium solution in the second chamber.

The cathode electrode 3 in the cell assembly 4 and the first piping 6, the first chamber 5 and the second piping 7 in the regenerator 17 constitute the mediator-containing solution circulation path. In general, the circulation path is provided with mediator-containing solution circulation device such as a liquid pump 15.

The cell assembly 4 is not particularly limited, as long as it includes a plurality of fuel cells. As the cell assembly 4, examples include, but are not limited to, a fuel cell assembly composed of a stack of flat plate cells, and a fuel cell module composed of connected hollow cells.

Also, the cell assembly 4 may be a cell assembly in which a hydrogen gas is used as a fuel gas in the anode electrode 2, or it may be a redox type fuel cell in which a mediator-containing solution is used.

In the cell assembly 4, the anode electrode 2 and the cathode electrode 3 are electrically connected to a load 14.

The first chamber 5 in the regenerator is configured to store the mediator-containing solution. The first chamber 5 and the second chamber 8 may be separate containers, the inside of a container may be separated by a partition or membrane having the ion exchange path 12, and one of the resulting spaces may be used as the first chamber, and the other may be used as the second chamber.

The first chamber 5 includes the first electrode 10 connected to the positive electrode of the power source 9.

In the present invention, the mediator-containing solution is a solution in which the mediator, which serves as a redox couple, is contained.

The mediator used in the present invention is not particularly limited. As the mediator, examples include, but are not limited to, heteropolyoxometalates (oxides) such as phosphomolybdate, phosphovanadate and phosphotungsate; oxidases such as galactose oxidase, bilirubin oxidase and glucose oxidase; and metal-centered complexes having effects similar to the oxidases. These mediators may be fixed on a support such as alumina.

The solution that is used to contain the mediator is not particularly limited. For example, a solution of sulfuric acid, phosphoric acid or the like may be used.

The first piping 6 in the regenerator of the present invention is configured to connect the cathode electrode 3 in the cell assembly 4 and the first chamber 5 in the regenerator 17 and allow the mediator-containing solution to flow from the cathode electrode 3 to the first chamber 5.

The second piping 7 in the regenerator 17 is configured to connect the first chamber 5 in the regenerator and the cathode electrode 3 in the cell assembly 4 and allow the mediator-containing solution to flow from the first chamber 5 to the cathode electrode 3.

The second chamber 8 in the regenerator 17 is configured to store the oxygen reduction reaction medium solution. The second chamber 8 includes the gas supplier 13 configured to supply the oxygen-containing gas into the oxygen reduction reaction medium solution, and the second electrode 11 connected to the negative electrode of the power source 9.

In the present invention, the oxygen reduction reaction medium solution is a solution that serves as a medium for supplying electrons from the second electrode 11 to the oxygen in the gas injected in the oxygen reduction reaction medium solution and reduces the oxygen. The pH of the oxygen reduction reaction medium solution may be acidic. For example, a solution of sulfuric acid, phosphoric acid or the like may be used. In the present invention, the acidic pH is pH 2 or less.

A catalyst may be dispersed in the oxygen reduction reaction medium solution. As the catalyst in the oxygen reduction reaction medium solution, examples include, but are not limited to, transition metal oxides (e.g., $NiO_x$, $MnO_x$, $Co_yO_x$) and noble metal oxides. In addition, an organometallic complex may be added as a reaction aid.

A wiring from the positive electrode of the power source 9, the first electrode 10, the mediator-containing solution, the ion exchange path 12, the oxygen reduction reaction medium solution, the second electrode 11, and a wiring from the negative electrode of the power source 9 constitute the external circuit of the power source 9.

The first electrode 10 is connected to the positive electrode of the power source 9 in the regenerator 17. The second electrode 11 is connected to the negative electrode of the same. As the power source, generally, a DC power source including a potentiostat or an operational amplifier may be used. A potential or part of generated electrical energy can be supplied from the load 14 that is electrically connected to the cell assembly 4. At this time, the anode electrode 2 of the cell assembly 4 in a state of being supplied with hydrogen, may be referred to as a standard hydrogen electrode.

The first electrode 10 is connected to the positive electrode of the power source 9 and is disposed to be immersed in the mediator-containing solution stored in the first chamber 5.

The raw material for the first electrode 10 is not particularly limited. For example, a titanium alloy, a nickel alloy or an iron alloy may be used. When a corrosive material such as an iron alloy is used, the corrosive material may be very slightly coated with a corrosion-resistant metal (e.g., Ti, W, V).

To increase the surface area, the first electrode 10 may have a large size, or it may be in a mesh form. A transition metal (e.g., Co, Fe, Ni, Mn, V, Mo) or a very slight amount of noble metal (e.g., Pt, Pd, Ru) may be present on the electrode surface as a catalyst.

Also, the first electrode 10 may be multistage or may be in such a form that the mediator-containing solution flows around the first electrode 10 in the first chamber 5.

The second electrode 11 is connected to the negative electrode of the power source 9 and is disposed to be immersed in the oxygen reduction medium solution stored in the second chamber 8.

The raw material for the second electrode 11 is not particularly limited. For example, a nickel alloy or an iron alloy may be used. When an iron alloy is used, the alloy may be very slightly coated with a corrosion-resistant metal (e.g., Ti, W, V).

To allow a gas-liquid reaction to easily proceed, the second electrode 11 may be in a mesh form, or a transition metal (e.g., Co, Fe, Ni, Mn, V, Mo) or a very slight amount of noble metal (e.g., Pt, Pd, Ru) may be present on the electrode surface as a catalyst.

Also, the second electrode 11 may be multistage or may be in such a form that the oxygen reduction reaction medium solution flows around the second electrode 11 in the second chamber 8.

In the regenerator 17, the first chamber 5 and the second chamber 8 are connected via the ion exchange path 12.

The ion exchange path is a path that is able to exchange ions and contribute to electrical continuity between two solutions that should not be mixed. The ion exchange path functions to exchange ions, with preventing mixing with an electrolytic solution. Therefore, hydrogen ions transfer between the first chamber 5 and the second chamber 8. As the ion exchange path, a cation exchange membrane or a salt bridge obtained by dissolving salts, agar, etc., in water and solidifying the mixture in a glass U-pipe, etc., may be used.

As the cation exchange membrane, examples include, but are not limited to, commercially-available inorganic electrolyte materials such as NAFION (trade name; manufactured by: DuPont), FLEMION (trade name; manufactured by: Asahi Glass Co., Ltd.), ACIPLEX (trade name; manufactured by: Asahi Kasei Chemicals Corporation), AQUIVION (trade name; manufactured by: Solvay), Fumasep (trade name; manufactured by: Fumatec), hydrocarbon-based membranes (manufactured by: JSR Corporation) and hydrocarbon-based membranes (manufactured by: JSR Corporation); hydroxy-based polymer; and organic/inorganic hybrid membranes. In consideration of high-temperature operation, a fluorine-based membrane or an organic/inorganic hybrid membrane may be used.

When the cation exchange membrane is used as the ion exchange path 12, a membrane in a general planar form may be used, or a membrane in a hollow fiber membrane form may be used to increase the surface area.

When the water in the oxygen reduction reaction medium solution in the second chamber 8 diffuses and transfers to the mediator-containing solution in the first chamber 5 through the ion exchange path, the redox type fuel cell of the present invention may include a mechanism for controlling the water in the mediator-containing solution.

In the second chamber 8 in the regenerator 17, the gas supplier 13 configured to supply the oxygen-containing gas into the oxygen reduction reaction medium solution, is disposed.

To supply the gas, a gas injection method or a gas bubbling method may be used, for example. In the case of gas bubbling, in order to increase a gas-liquid reaction area between the oxygen reduction reaction medium solution and oxygen, a bubbler that is able to produce fine bubbles may be used. The bubbler may be in a form of being integrated with the second electrode 11 so as to be able to bubble a gas to the vicinity of the electrode. For efficient contact of the second electrode 11 with gas bubbles, a liquid delivery pump or a stirrer may be disposed in the second chamber 8.

In general, the oxygen-containing gas is air. As the gas supplier, for example, an air pump may be generally used.

In the second chamber 8, a gas outlet 16 is generally disposed, which is configured to emit the injected air and water vapor produced in association with the reduction of the oxygen. The gas outlet may include a gas-liquid separator configured to turn the water vapor produced in association with the oxygen reduction into liquid and return the liquid to the second chamber 8. Also, the second chamber 8 may include a heater configured to control the water amount and prevent or lift the freezing of water.

The operating condition of the redox fuel cell of the present invention will be explained.

The redox type fuel cell of the present invention has the above-described basic structure and is characterized as follows: by turning on electricity using the power source, the reduced mediator contained in the mediator-containing solution can be oxidized in the first chamber, and the oxygen supplied from the gas supplier can be reduced in the second chamber.

Figure 2:
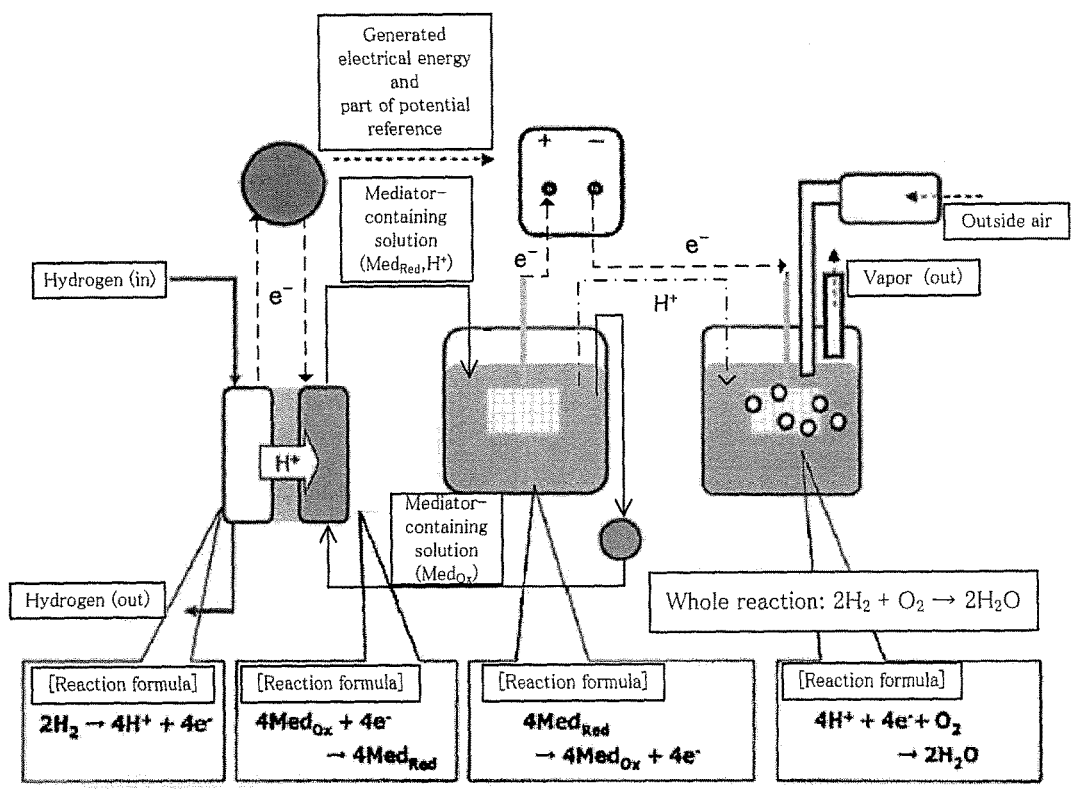
FIG. 2 is a view showing the outline of the operating condition of the redox type fuel cell according to the present invention.

With reference to FIG. 2, the outline of the operating condition of the redox type fuel cell of the present invention will be explained.

In the anode electrode of the cell assembly, a hydrogen gas (fuel) is oxidized according to the following formula (1):

$$2H_2 \rightarrow 4H^+ + 4e^- \quad \text{Formula (1):}$$

The thus-produced hydrogen ions transfer to the cathode electrode through the electrolyte membrane. The electrons transfer to the cathode electrode through an external circuit and then a load.

In the cathode electrode of the cell assembly, the oxidized mediator ($Med_{Ox}$) is reduced by the electrons that transferred to the cathode electrode through the external circuit, according to the following formula (2), thereby becoming the reduced mediator ($Med_{Red}$). As an example, the case of using a mediator that is reactive with one electron per molecule is described here.

$$4Med_{Ox} + 4e^- \rightarrow 4Med_{Red} \quad \text{Formula (2):}$$

The mediator-containing solution that contains the hydrogen ions and the reduced mediator, flows from the cathode electrode of the cell assembly to the first chamber of the regenerator through the first piping of the regenerator.

Once a potential is applied to the first electrode that is disposed in the first chamber and connected to the positive electrode of the power source, the reduced mediator ($Med_{Red}$) is electrochemically oxidized according to the following formula (3). At this time, the potential applied to the first electrode is +0.6 to +1.0 V vs. RHE (reversible hydrogen electrode).

$$4Med_{Red} \rightarrow 4Med_{Ox} + 4e^- \quad \text{Formula (3):}$$

At least a part of the mediator is oxidized in the first chamber, and the solvent that contains such a mediator flows from the first chamber to the cathode electrode of the cell assembly through a second flow path.

The hydrogen ions in the first chamber of the regenerator transfer to the second chamber through the ion exchange path.

Once a potential is applied to the second electrode that is disposed in the second chamber and connected to the negative electrode of the power source, an oxygen gas supplied from the gas supplier reacts with the hydrogen ions and is electrochemically reduced according to the following formula (4). At this time, the potential applied to the second electrode is theoretically +1.0 to +1.2 V vs. RHE. Actually, a potential obtained by adding an overvoltage to the theoretical value is needed, the overvoltage corresponding to the activation energy of the following formula (4):

$$4H^+ + 4e^- + O_2 \rightarrow 2H_2O \quad \text{Formula (4):}$$

When the oxygen reduction medium solution is gradually diluted by the water produced by the reaction of the formula (4), a device for emitting the produced water to the outside of the system may be disposed. As the device, examples include, but are not limited to, a miniheater and a porous film.

As a result of adding the formulae (1) to (4) together, the whole reaction of the fuel cell system of the present invention is represented by the following formula (5):

$$2H_2 + O_2 \rightarrow 2H_2O \quad \text{Formula (5):}$$

The oxidation of the mediator has been carried out by a gas-liquid reaction with an oxygen gas, resulting in an insufficient reaction rate. To sufficiently oxidize the mediator, extension of the length of the reaction path and promotion of the reaction by heating have been carried out, resulting in an increase in device size.

Meanwhile, in the redox type fuel cell of the present invention, the oxidation of the mediator can be quickly promoted at ordinary temperature by the use of the electrochemical reaction; therefore, the system can be downsized.

Also, the oxygen reduction reaction carried out in the second chamber can be carried out in the reaction site that is absolutely separated from the mediator-containing solution; therefore, unlike the prior art, the injected air does not enter the cathode electrode, and no water is produced in the mediator-containing solution and decreases the reaction efficiency in the cathode electrode of the fuel cell. Gas removal from the mediator-containing solution with a gas-liquid separator or the like is not needed; therefore, the system can be downsized further.

Also, like the prior art, the mediator regeneration reaction can be promoted by heating. Therefore, the regenerator can be combined with a heat exchanger or heater and controlled so that the electrochemical reaction can be carried out at a temperature with the highest energy efficiency.

EXAMPLES

Hereinafter, the present invention will be described further in detail, with reference to an example and a comparative example. However, the scope of the present invention may not be limited to the following examples. The following example and comparative example examined as to whether the mediator can be electrochemically regenerated by the regenerator of the present invention, using the cell assembly and the regenerator separately, and without connecting the cell assembly and the regenerator with the first and second pipings.

Example (Preparation of Mediator-containing Solution Before Use and Mediator-containing Solution after Electricity Generation)

First, a mediator-containing solution was prepared by dispersing polyoxometalate (POM), which is mainly composed of molybdenum, vanadium and oxidized phosphoric acid, in a 0.33 mol/L sulfuric acid solution at a concentration of 0.33 mol/L. The mediator-containing solution thus prepared is referred to as the mediator-containing solution before use. Electricity generation was carried out for 5 hours by allowing the cathode electrode of the redox type fuel cell described in the above embodiment to circulate 1000 mL of the mediator-containing solution before use at a flow rate of 50 mL/min and supplying a non-humidified hydrogen gas to the anode electrode at a flow rate of 20 mL/min. The mediator-containing solution thus prepared is referred to as the mediator-containing solution after electricity generation.
(Regeneration of Mediator after Electricity Generation)

First, 300 mL of the mediator-containing solution after electricity generation was added to the first chamber of the regenerator of the present invention.

An oxygen reduction reaction medium solution (300 mL of a 0.33 mol/L sulfuric acid solution) was added to the second chamber, and a catalyst was added thereto at a concentration of 0.33 mol/L.

Copper was used as the material for the first electrode of the regenerator. The surface of the first electrode was coated with dense platinum as a catalyst. The area of the first electrode was 1 cm$^2$, and the form was a mesh form.

As with the first electrode, copper was used as the material for the second electrode, and the surface of the second electrode was coated with dense platinum as a catalyst. The area of the second electrode was 1 cm$^2$, and the form was a mesh form. The second electrode was disposed so that it can be efficiently brought into contact with bubbles supplied from a bubbler. The bubbles had a diameter of about 50 μm.

The amount of the air supplied from the bubbler was 20 cm$^3$/min.

NAFION in a flat form having an area of 25 cm$^2$ (product name: NRE-212) was used as an ion exchange path.

As a power source to be connected with the first and second electrodes, a DC power source (product name: PAS60-6; manufactured by: Kikusui Electronics Corporation) was used.

In the regenerator of the above structure, an oxidation reaction was developed by turning on electricity at ambient temperature (25° C.), without circulating the mediator-containing solution.
(Transmission Spectrum Measurement)

After 15 minutes, 30 minutes, 60 minutes, 90 minutes and 120 minutes passed from the start of the turning on of electricity from the power source, the transmission spectrum (350 to 780 nm) of the mediator-containing solution was measured by a spectrophotometer.

Also, the transmission spectrum of the mediator-containing solution before use and that of the mediator-containing solution after electricity generation were measured for comparison.
(Electricity Generation Performance Test)

First, the cathode electrode of the redox type fuel cell that was used for the preparation of the mediator-containing solution after electricity generation, was allowed to circulate 300 mL of the mediator-containing solution before use at a flow rate of 50 mL/min. Meanwhile, a non-humidified hydrogen gas was supplied to the anode electrode at a flow rate of 200 mL/min for electricity generation, and the current value of the load connected to the redox type fuel cell was changed, thereby measuring the relationship of current density (A/cm$^2$) to electricity generation voltage (V). The same test was carried out on 300 mL of the mediator-containing solution after electricity generation, 300 mL of the mediator-containing solution after electricity generation which was regenerated by turning on electricity from the power source for 15 minutes, 300 mL of the mediator-containing solution after electricity generation which was regenerated by turning on electricity from the power source for 30 minutes, 300 mL of the mediator-containing solution after electricity generation which was regenerated by turning on electricity from the power source for minutes, 300 mL of the mediator-containing solution after electricity generation which was regenerated by turning on electricity from the power source for 90 minutes, and 300 mL of the mediator-containing solution after electricity generation which was regenerated by turning on electricity from the power source for 120 minutes.

Comparative Example

As a catalyst, 5 g of a platinum-supported aluminum oxide (platinum supporting rate 5%) was dispersed in 300 mL of a mediator-containing solution after electricity generation, which was prepared in the same manner as Example. With stirring the mediator-containing solution after electricity generation, air bubbles having a diameter of about 50 μm were supplied to the solution for 120 minutes in the following conditions: ambient temperature (25° C.) and 500 cm$^3$/min.

In the same manner as Example, the transmission spectrum measurement and the electricity generation performance test were carried out.
(Results)

Figure 3A:
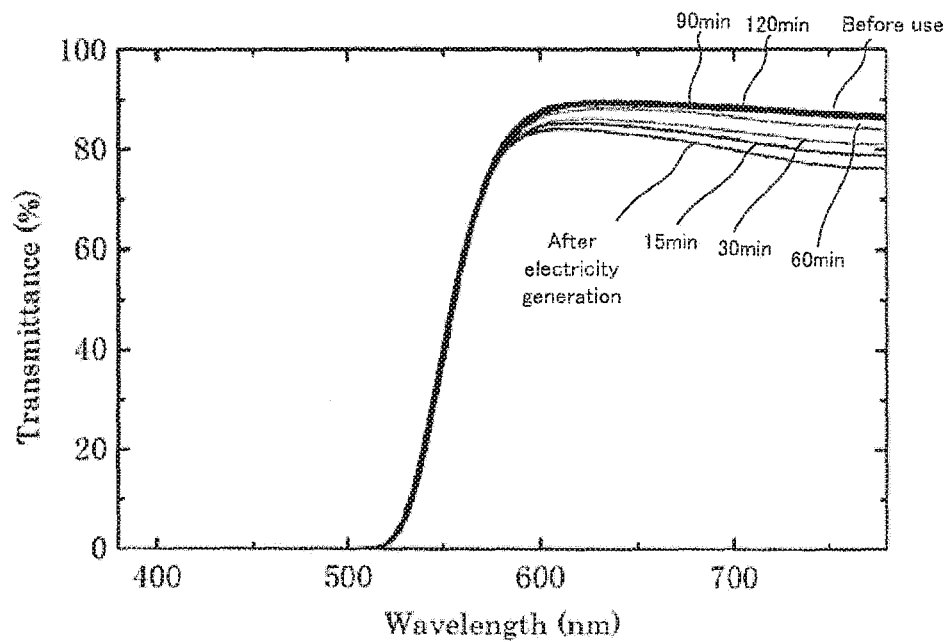
FIG. 3(a) and FIG. 3(b) are views showing the transmission spectrum of the mediator-containing solution before use and the transmission spectra of the mediator-containing solution after electricity generation, which were measured each time electricity was turned on to the mediator-containing solution after electricity generation, using the regenerator of the redox type fuel cell of the present invention.
Figure 3B:
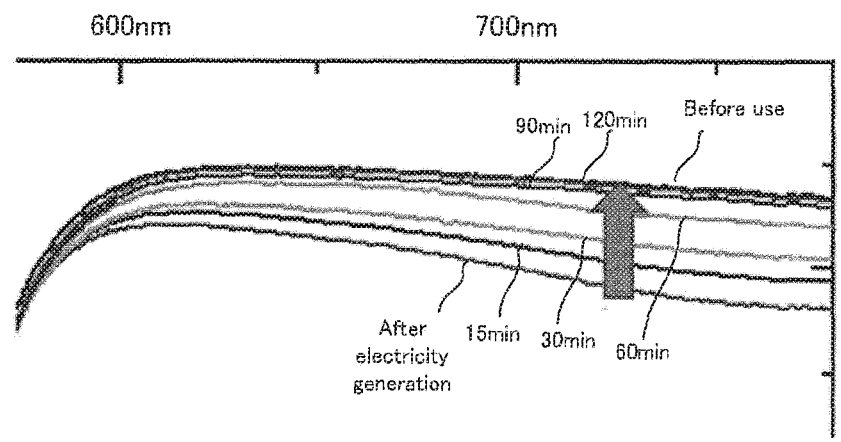

FIG. 3(a) shows the transmission spectrum (wavelength 350 to 780 nm) of the mediator-containing solution before use, that of the mediator-containing solution after electricity generation, that of the mediator-containing solution after 15 minutes passed from the start of the turning on of electricity, that of the mediator-containing solution after 30 minutes passed from the start of the turning on of electricity, that of the mediator-containing solution after 60 minutes passed from the start of the turning on of electricity, that of the mediator-containing solution after 90 minutes passed from the start of the turning on of electricity, and that of the mediator-containing solution after 120 minutes passed from the start of the turning on of electricity. FIG. 3(b) is an enlarged view of a 550 to 780 nm area.

While the transmittance at 750 nm of the mediator-containing solution before use at 750 nm is 86%, that of the mediator-containing solution after electricity generation is 75% and lower.

The transmittance at 750 nm of the reduced polyoxometalate used in Example, is known to be lower than the transmittance at 750 nm of the oxidized polyoxometalate. From this result, it is shown that the mediator was reduced by electricity generation.

The transmittance at 750 nm increased over time to 77% after 15 minutes passed from the start of the turning on of electricity in the regenerator, 81% after 30 minutes passed, 83% after 60 minutes passed, and 85% after 90 minutes passed. Finally, the transmittance at 750 nm increased to 86% after 120 minutes passed, which is almost the same as the transmittance of the mediator-containing solution before use.

Figure 4:
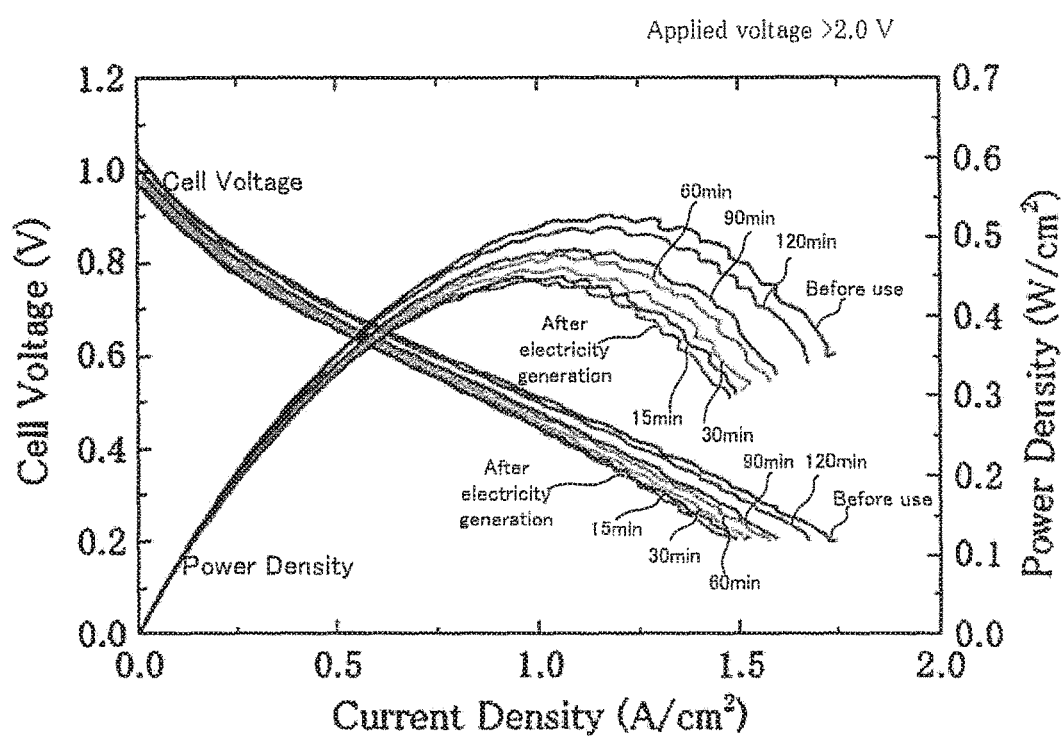
FIG. 4 is a view showing the electricity generation performance of the redox type fuel cell using the mediator-containing solution before use, using the mediator-containing solution after electricity generation, and using the mediator-containing solution regenerated by the use of the regenerator of the redox type fuel cell of the present invention.

The left vertical axis of FIG. 4 shows the relationship of the current density (A/cm$^2$) of the redox type fuel cell to the electricity generation voltage (V), when electricity generation was carried out using the mediator-containing solution before use, the mediator-containing solution after electricity generation, and the mediator-containing solution to which electricity was turned on using the regenerator of the present invention. The right vertical axis shows the relationship of the current density (A/cm$^2$) of the redox type fuel cell to the power density (W/cm$^2$). The relationship of the current density (A/cm$^2$) to the electricity generation voltage (V) is also described as voltage-current density characteristics and is used to compare the performances of fuel cells.

As shown in FIG. 4, the graph of the voltage-current density characteristics of the mediator-containing solution before use differs from the graph of the mediator-containing solution after electricity generation. A decrease in electricity generation performance is found in the case of using the mediator-containing solution after electricity generation. However, as the time of turning on electricity to the mediator-containing solution after electricity generation using the regenerator of the present invention increases, the graph of the mediator-containing solution after electricity generation starts to match the graph of the mediator-containing solution before use and shows almost the same performance after 120 minute passed.

The following Table 1 shows open-circuit voltages (OCVs) at the time electricity generation, in the case where the fuel cell generated electricity using the mediator-containing solution before use, using the mediator-containing solution after electricity generation, and using the mediator-containing solution to which electricity was turned on using the regenerator of the present invention, all of which mediator-containing solutions were obtained in Example.

TABLE 1

| POM solution | OCV (V) Applied voltage >2.0 V |
|---|---|
| Before use | 1.03 |
| After electricity generation | 0.96 |
| 15 Minutes after application of voltage | 0.97 |
| 30 Minutes after application of voltage | 0.98 |
| 60 Minutes after application of voltage | 1.00 |
| 90 Minutes after application of voltage | 1.01 |
| 120 Minutes after application of voltage | 1.03 |

As shown in Table 1, even the open-circuit voltage (OCV) at the time of electricity generation became closer to the open-circuit voltage of the mediator-containing solution before use, as the time of turning on electricity to the mediator-containing solution after electricity generation increases, and it matched the open-circuit voltage of the mediator-containing solution before use, after 120 minutes passed.

From the above results, it is clear that the mediator can be reliably oxidized and regenerated at ambient temperature by the use of the regenerator of the redox type fuel cell of the present invention.

Meanwhile, when the air was bubbled into the mediator-containing solution after electricity generation by the method of Comparative Example, there was no change in the color of the mediator-containing solution before and after the bubbling, and there was also no change in the transmission spectrum. This is thought to be because the polyoxometalate could not be oxidized and regenerated only by the air bubbling at ambient temperature.

Also, electricity generation was tried by circulating, through the fuel cell, the mediator-containing solution after the bubbling. However, there was no change in the electricity generation performance, compared to the mediator-containing solution before the bubbling.

Like the prior art, when the mediator is oxidized only by a gas-liquid reaction, the oxidation reaction hardly proceeds at ordinary temperature, or the reaction rate is very slow. Therefore, the reaction rate is increased by heating the mediator to 70 to 80° C. By the present invention, it is clear that the mediator can be quickly regenerated even at ordinary temperature (ambient temperature) by the use of the electrochemical reaction.

From the above, it is clear that in the redox type fuel cell of the present invention, the mediator can be quickly regenerated even at ordinary temperature, and the water production problem in the mediator-containing solution in association with an oxygen reduction reaction and the residual gas problem in association with the injection of the oxygen-containing gas into the mediator-containing solution, can be avoided.

REFERENCE SIGNS LIST

1. Electrolyte membrane
2. Anode electrode
3. Cathode electrode
4. Cell assembly
5. First chamber
6. First piping
7. Second piping
8. Second chamber
9. Power source
10. First electrode
11. Second electrode
12. Ion exchange path
13. Gas supplier
14. Load
15. Liquid pump
16. Gas outlet
17. Regenerator
20. Redox type fuel cell of the present invention

The invention claimed is:

1. A redox type fuel cell,
wherein a mediator circulation path is disposed between a cathode electrode and a regenerator, and a mediator reduced at the cathode electrode is oxidized with the regenerator and supplied to the cathode electrode again;
wherein the regenerator comprises:
a first chamber configured to store a mediator-containing solution;
a first piping configured to allow the mediator-containing solution to flow from the cathode electrode to the first chamber;
a second piping configured to allow the mediator-containing solution to flow from the first chamber to the cathode electrode;
a second chamber configured to store an oxygen reduction reaction medium solution;
a power source;
a first electrode disposed in the first chamber and connected to a positive electrode of the power source;
a second electrode disposed in the second chamber and connected to a negative electrode of the power source;
an ion exchange path configured to connect the first chamber and the second chamber; and
a gas supplier configured to supply an oxygen-containing gas into the oxygen reduction reaction medium solution in the second chamber; and
wherein, by turning on electricity using the power source, the reduced mediator contained in the mediator-containing solution can be oxidized in the first chamber, and the oxygen supplied from the gas supplier can be reduced in the second chamber.

2. The redox type fuel cell according to claim 1, wherein the oxygen reduction reaction medium solution in the second chamber is acidic.

* * * * *